Dec. 26, 1961 G. G. WARD 3,014,539
IMPLEMENT ATTACHING APPARATUS
Filed Dec. 7, 1959

INVENTOR.
Gerald G. Ward
Paul O. Pippel
Atty.

3,014,539
IMPLEMENT ATTACHING APPARATUS
Gerald G. Ward, Downers Grove, Ill., assignor to International Harvester Company, Chicago, Ill., a corporation of New Jersey
Filed Dec. 7, 1959, Ser. No. 857,972
4 Claims. (Cl. 172—443)

This invention relates to implement attaching apparatus for tractors and particularly to improved means incorporated in the hitch structure for stabilizing the implement in operation.

The structure and operation of the so-called three-point hitch for connecting implements to tractors are well known. A pair of laterally spaced lower draft links are pivotally connected at their forward ends to the tractor and at their rear ends to the implement. An upper link generally parallel to the lower links extends therebetween and is pivotally connected to the tractor and to a standard or upstanding section of the implement frame, and the implement is usually lifted on the tractor for transport by the connection of power lift arms on the tractor to the lower draft links.

Forward tilting of the implement due to draft forces acting thereon places the upper link in compression, exerting a forward and downward force on the tractor. With an implement such as a disk plow, it is frequently moved laterally relative to the tractor by forces acting sidewise against the implement. This also swings the upper and lower hitch links laterally and, inasmuch as the upper link is under compression by the normal draft load acting on the earth working tools, the upper link becomes cocked to one side, preventing the return of the implement to a normal centered position between the tractor drive wheels. This cocking of the compression link can only be corrected by stopping the tractor to remove the draft load or lifting the implement to its transport position.

Therefore, the principal object of this invention is the provision of an improved attaching mechanism for connecting an implement to a tractor.

Another object of the invention is the provision of an improved hitch structure of the three-point type for mounting an implement on a tractor to be transported thereby when not in operation, wherein novel means are provided for stabilizing the implement by automatically maintaining it in its proper relation to the propelling vehicle.

Another object of the invention is the provision of an implement hitch structure of the three-point type wherein the equivalent of the upper link acts in tension instead of compression to control the operation of the implement.

Figure 1:
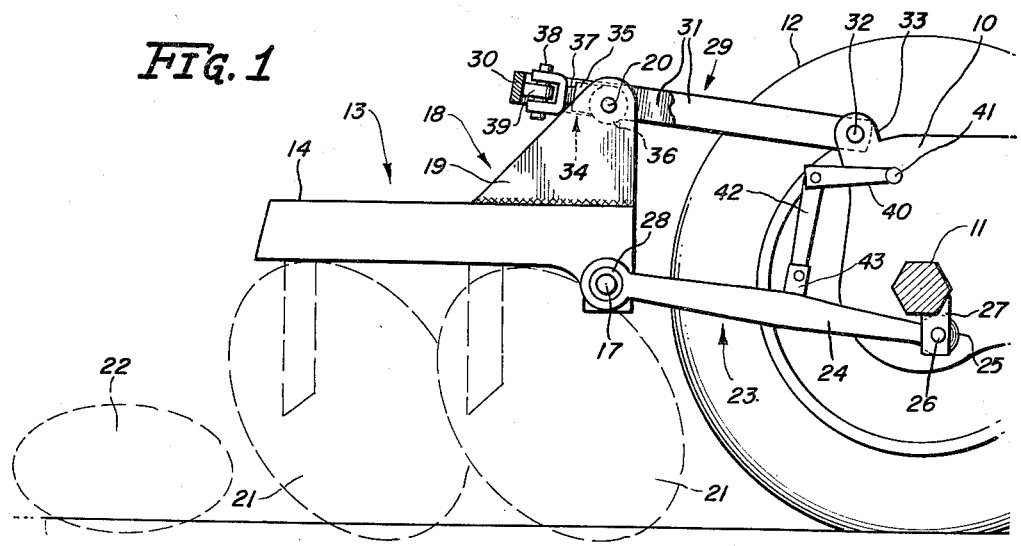
Figure 2:
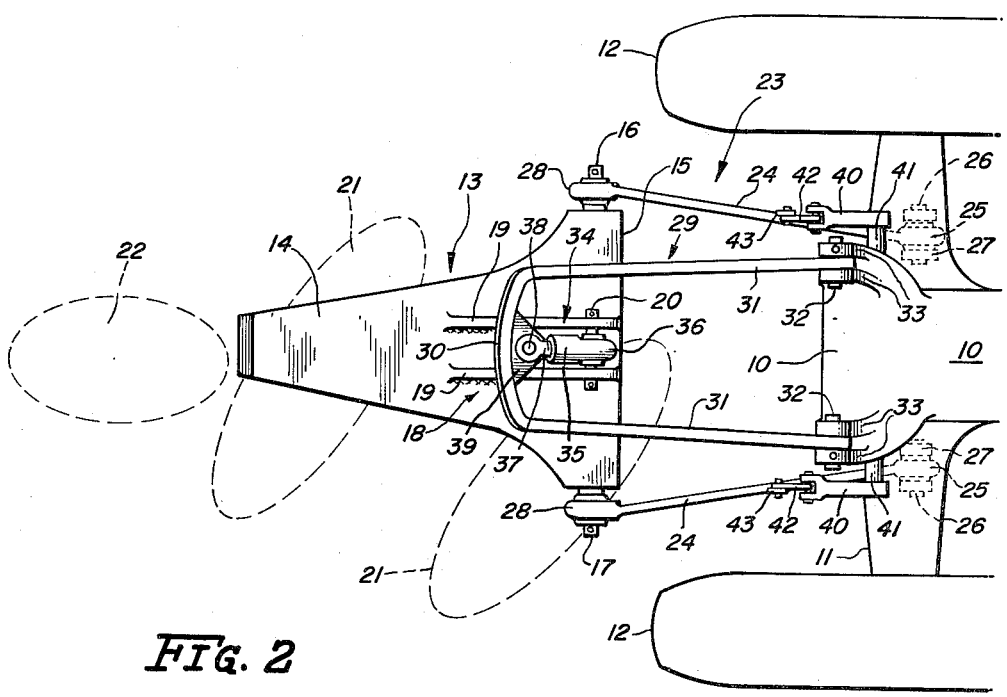

Other objects and advantages of the invention will become clear from the following detailed description when read in conjunction with the accompanying drawings, wherein:

FIG. 1 is a view in side elevation of the rear end of a tractor with one wheel removed, having an implement mounted thereon by an attaching apparatus incorporating the features of this invention, the earth working tools being shown diagrammatically; and FIG. 2 is a plan view of the structure shown in FIG. 1.

In the drawings the numeral 10 designates the longitudinally extending body of a tractor having a transverse rear axle structure 11 and laterally spaced drive wheels 12.

The implement with which this invention is concerned is shown generally diagrammatically and represents a disk plow designated by the numeral 13. The disk plow 13 is illustrated by way of example as representative of the type of implement which must be allowed a certain freedom of lateral movement with respect to the tractor in order to follow accurately in the path thereof. The disk plow has a frame 14 having a broadened forward end 15 from the ends of which project stub shafts 16 and 17. To the forward end of the plow frame, between shafts 16 and 17, is affixed a standard or upright 18 comprising laterally spaced plates 19 the upper ends of which have mounted therebetween a pivot pin 20. Earth working tools in the form of disks 21, and a furrow wheel 22, shown in dotted lines, form a part of the implement, although it may be understood that moldboard plows and the like may also be utilized.

The implement of this invention is attached to the tractor by hitch mechanism 23 comprising a pair of laterally spaced, forwardly converging draft links 24 pivotally connected at their forward ends by universal joints 25 to pivot pins 26 carried by spaced pairs of lugs 27 affixed to the axle housings 11 and depending therefrom.

The rear ends of draft links 24 are pivotally connected by universal joints 28 to the stub shafts 16 and 17. Draft links 24 and the tool-carrying implement frame 14 are thus capable not only of vertical swinging but lateral swinging as well with respect to the tractor. Implement 13 is also capable of tilting about the transverse axis formed by the shafts 16 and 17.

As pointed out before, in a conventional three-point implement attaching apparatus wherein an upper link is connected between the implement and the tractor to exert a force forwardly and downwardly against the tractor in response to draft forces on the implement, these very draft forces cause the upper link to become cocked when the implement swings laterally relative to the tractor and prevents it from returning to its normal operating position. In order to avoid this eventuality applicant has provided a U-shaped member or bail 29 having a rear transverse or bight portion 30 and forwardly diverging legs 31, the forward ends of which are pivotally mounted on pins 32 carried by a pair of lugs 33 affixed at laterally spaced locations to the tractor body. By virtue of this connection the member 29 is capable of substantially no lateral swinging relative to the tractor.

In order to control the operation of the implement and also to regulate its working depth, the transverse portion 30 of member 29 is extended rearwardly of, and legs 31 straddle the upper portion of the standard 18. A tension link 34 is provided comprising a sleeve member 35 connected by a universal joint 36 to the pin 20. Sleeve 35 is threaded to receive a threaded bolt 37 bifurcated for pivotal mounting upon a pin 38 carried by a plate 39 affixed to the transverse portion 30 of member 29.

Draft forces causing the implement frame 14 to tilt forwardly about the axes of shafts 16 and 17 place the link 34 in tension and exert a force forwardly through the member 29 to the tractor to improve the traction thereof and maintain the uniform operation of the implement. Due to the universal connection of the forward end of link 34 to pin 20 and the pivotal connection of the rear end thereof to pin 38, the implement is capable of lateral swinging relative to the tractor with the draft links 24 with respect to the tractor and the stabilizing member 29. Also, by virtue of the fact that the link 34 is in tension as it exerts force forwardly through member 29 to the tractor, it moves laterally abut the pivot 38 relative to the tractor when the implement swings laterally and returns to its normal operating position.

For the purpose of adjusting the operating depth of the implement, the latter may be tilted to pitch the earth working tools downwardly or upwardly by disconnecting bolt 37 from pin 38 and increasing or decreasing the length of link 34.

The implement with which this invention is concerned is adpted to be raised on the tractor for transport and this is accomplished by any suitable mechanism such as the lift arms 40 mounted at the ends of a rockshaft 41 rocked by any suitable power means, not shown, to vertically swing the arms 40. Arms 40 are connected by links 42 with lugs 43 secured to the draft links 24.

It is believed that the construction and operation of the novel implement attaching apparatus of this invention should be clearly understood from the foregoing description. It should likewise be understood that the invention has been described in its preferred embodiment and that modifications may be made therein without departing from the spirit of the invention or the scope of the appended claims.

What is claimed is:

1. Hitch mechanism for connecting to a tractor an implement having a tool-carrying frame and an upwardly extending standard at its forward end, comprising a pair of laterally spaced draft links pivotally connected at their forward ends to the tractor and at their rear ends to the implement to accommodate vertical and lateral swinging of the links and forward tilting of the implement relative thereto in response to draft forces acting on the tool-carrying frame, a member pivotally connected at its forward end to the tractor above said links having its rear end extending rearwardly of said standard, and a generally longitudinally extending thrust link pivotally connected at its rear end to the rear end of said member and at its forward end to said standard, whereby forward tilting of the implement and standard transmits a force forwardly through said thrust link and said member to the tractor.

2. Attaching apparatus for the connection to a tractor of an implement having a tool-carrying frame and an upwardly extending standard at the forward end thereof, comprising a pair of laterally spaced lower draft links pivotally connected to the tractor and to the implement by means accommodating lifting and lateral swinging thereof and of the implement relative to the tractor, a U-shaped member vertically spaced above said links having its transverse portion disposed rearwardly of said standard and its forwardly extending legs pivotally connected at laterally spaced locations to the tractor for vertical swinging, and a tension link pivotally connected at its forward end to said standard and at its rear end to the transverse portion of said U-shaped member, said tension link being responsive to draft forces acting on the tool-carrying frame to transmit under tension a forwardly directed force through said U-shaped member to the tractor.

3. Hitch mechanism for connecting to a tractor an implement having a tool-carrying frame and an upwardly extending standard at its forward end, comprising a pair of laterally spaced draft links pivotally connected by means forming universal joints at their forward ends to the tractor and at their rear ends to the implement to accommodate vertical and lateral swinging of the links and forward tilting of the implement relative thereto in response to draft forces acting on the tool-carrying frame, a member mounted on the tractor above said links extending rearwardly and through which thrust is transmitted to the tractor, said member having a portion disposed rearwardly of said standard, and a generally longitudinally extending thrust link pivotally connected by means forming universal joints to said member and said standard, said thrust link being adapted to transmit the force exerted by the forward tilting of the implement through said member to the tractor.

4. The invention set forth in claim 3, wherein said thrust linke is adjustable in length.

References Cited in the file of this patent

UNITED STATES PATENTS

| | | |
|---|---|---|
| 1,490,053 | Willingham et al. | Apr. 8, 1924 |
| 1,589,033 | Wilson | June 15, 1926 |
| 2,734,290 | Tuttle | Feb. 14, 1956 |
| 2,795,178 | Silver et al. | June 11, 1957 |
| 2,934,357 | Gewecke | Apr. 26, 1960 |
| 2,960,172 | Henson | Nov. 15, 1960 |

FOREIGN PATENTS

| | | |
|---|---|---|
| 957,796 | Germany | Feb. 7, 1957 |
| 141,798 | Sweden | Aug. 25, 1953 |